United States Patent [19]

Kämper

[11] Patent Number: 5,295,664
[45] Date of Patent: Mar. 22, 1994

[54] MOTOR-DRIVEN TENSIONING AND WINDING DEVICE FOR LASHING STRAPS INCLUDING AN INTEGRATED CONTROL OF THE LASHING TENSION

[75] Inventor: Hans-Werner Kämper, Würselen, Fed. Rep. of Germany

[73] Assignee: Spanset Inter AG, Oetwil am See, Switzerland

[21] Appl. No.: 656,087

[22] PCT Filed: Jul. 1, 1990

[86] PCT No.: PCT/DE90/00491

§ 371 Date: Mar. 4, 1991

§ 102(e) Date: Mar. 4, 1991

[87] PCT Pub. No.: WO91/00196

PCT Pub. Date: Jan. 10, 1991

[30] Foreign Application Priority Data

Jul. 3, 1989 [DE] Fed. Rep. of Germany ... 8908090[U]

[51] Int. Cl.$^5$ ............................ B66D 1/00; B60P 7/08
[52] U.S. Cl. ................................ 254/220; 254/273; 254/342
[58] Field of Search ............ 254/272, 273, 362, 213, 254/342, 220; 73/159, 160, 862.42, 862.45, 862.47; 410/12, 100, 103

[56] References Cited

U.S. PATENT DOCUMENTS

| | | | |
|---|---|---|---|
| 2,188,062 | 1/1940 | Schröder | 254/273 X |
| 2,303,847 | 12/1942 | Lamond | 254/362 X |
| 2,528,883 | 11/1950 | Hayward | 73/862.45 X |
| 2,743,607 | 5/1956 | Decker | 73/862.47 |
| 3,176,510 | 4/1965 | Kimmell et al. | 73/862.45 |
| 3,240,473 | 3/1966 | Coffey et al. | 254/220 X |
| 4,036,476 | 7/1977 | Douce et al. | 410/103 |
| 4,491,301 | 1/1985 | Pendola | 254/273 X |
| 4,641,875 | 2/1987 | Speich | 294/82.11 |
| 4,706,343 | 11/1987 | Neidigk | 410/103 |

FOREIGN PATENT DOCUMENTS

| | | |
|---|---|---|
| 0145646 | 10/1987 | European Pat. Off. . |
| 278967 | 10/1914 | Fed. Rep. of Germany ... 73/862.45 |
| 1194771 | 6/1970 | United Kingdom . |
| 2128574 | 5/1984 | United Kingdom . |
| 2166704 | 5/1986 | United Kingdom . |

Primary Examiner—Katherine Matecki
Attorney, Agent, or Firm—Spencer, Frank & Schneider

[57] ABSTRACT

Electromotor driven tensioning and winding device for lashing straps (7) in integral construction, preferably including a tactile three-point measurement sensor (2) in direct contact with a flat side (40) of the lashing strap (7). For this purpose, the measurement sensor (2) includes a sensor bar (30) which is mounted against a compression spring element (31) and has a contact pin (34) which is movable together with the sensor bar (30) and can be pressed against a contact plate (37) fastened to the rear wall (32) of the measurement sensor housing (27).

If the desired tension of the lashing strap is reached, the contact pin (34) lies against the contact plate (37). If the contact between the contact plate (37) and the contact pin (34) is interrupted, the drive motor (3) receives a signal to tighten the lashing strap (7) by further winding it onto the wind-up spindle (6). The desired lashing tension of the lashing strap (7) is thus regulated continuously.

26 Claims, 3 Drawing Sheets

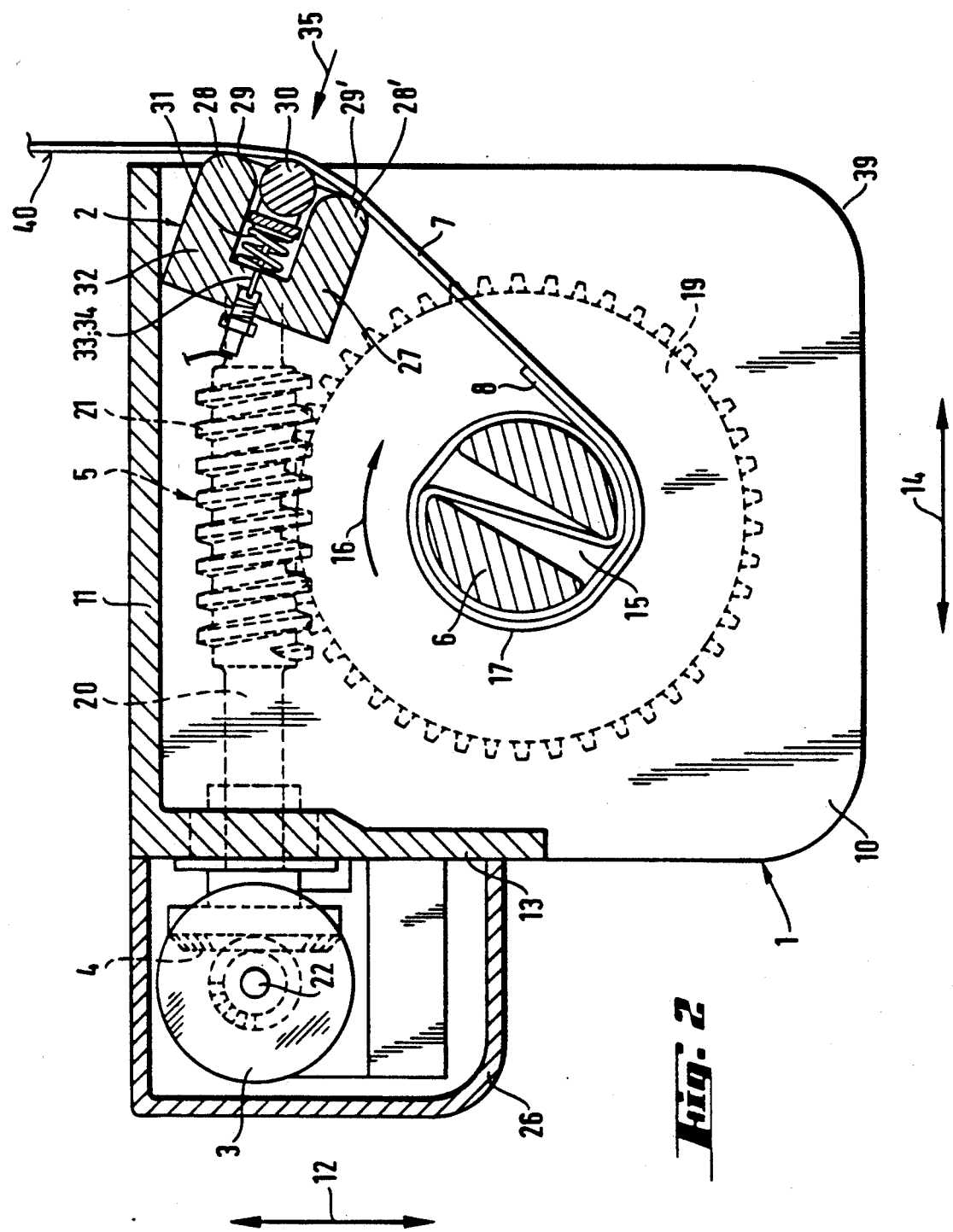

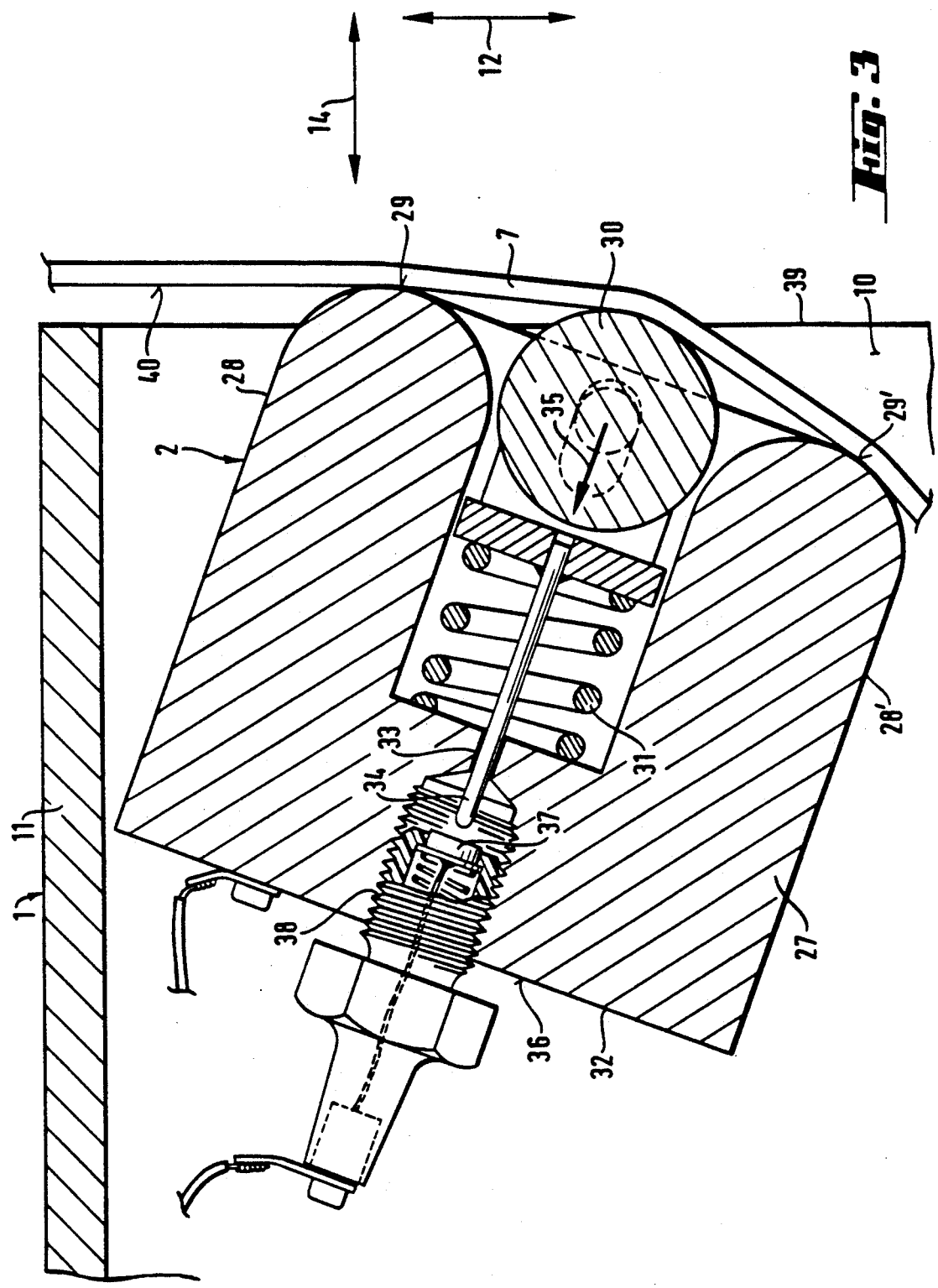

MOTOR-DRIVEN TENSIONING AND WINDING DEVICE FOR LASHING STRAPS INCLUDING AN INTEGRATED CONTROL OF THE LASHING TENSION

BACKGROUND OF THE INVENTION

The present invention relates to a motor-driven tensioning and winding device for lashing straps.

Such devices have been known for a long time, for example, as tensioning winches and ratchet spanners for tying down loads when movable goods are transported. It is also known to obtain a sufficiently secure tie-down of the load by charging or pre-loading the lashing strap with the highest possible lashing tension. If the term lashing strap is employed in this connection, this refers to a specially preferred embodiment of a lashing means in textile form. However, other lashing means, such as chains, ropes, cables and the like made of a variety of materials are also suitable for tying down loads. The conventional tensioning and winding devices produce the required lashing tension either manually or by motor, with the lashing strap always being charged with different, undefined lashing tensions. For the secure transport of lashed goods, however, a defined lashing tension is required which can be precisely determined from the weight of the load, the lashing angles, the consistency of the base of the load-carrying surface, particularly the friction effective between the load and the load-carrying surface, and the acceleration forces expected to occur during transport. Therefore, lashing tension measuring aids are known that are integrated in the tensioned strap to indicate to the operator the lashing tension exhibited in the tensioned strap during the tensioning process.

The drawback of such lashing tension measuring aids is that a drop in tension occurring during transport, for example due to settling of the load, generally remains unnoticed by the operator. If the lashing tension drops in this way to below a minimum value required to secure the load, parts of the load or, in the worst case, the entire load may drop from the load-carrying surface.

In order to prevent a drop in the effective lashing tension to below the critical minimum value, a tensioning winch is known which is driven by a compressed-air motor and can be mounted on or at the load-carrying surface of a truck and which is equipped with a control valve that charges the compressed-air motor with a desired pressure. This desired pressure can be set manually at the control valve. The compressed-air motor itself drives, by way of a drive assembly, a wind-up spindle for the lashing strap, thus winding the lashing strap around the rotating wind-up spindle. In this way, the tensioned strap is charged with an increasing lashing tension. A possible drop of the lashing tension effective in the tensioned strap is connected with a simultaneous drop in the actual pressure in the system. The compressed-air motor continues to rotate the wind-up spindle in the winding direction and the lashing strap continues to be wound up until the desired pressure set at the control valve is reached again. The particular drawback here is the exclusive control of the tensioning force by way of the desired pressure set at the control valve since this desired pressure is a function of the torque exerted by the tensioned strap on the wind-up spindle and on the drive assembly, respectively. However, the torque acting on the wind-up spindle is decisively influenced by the diameter of the strap coil on the wind-up spindle. This inevitably results in the drawback that, due to the increasingly larger coil diameter, the desired, defined lashing tension is no longer reached if re-tightening is effected by means of the originally set desired pressure. Consequently, the return signal in the form of the torque acting on the wind-up spindle for the described control circuit in the prior art tensioning winch is being measured only indirectly.

SUMMARY OF THE INVENTION

The invention is therefore based on the desire to configure a tensioning and winding device for lashing straps so that the lashing tension existing in the tensioned strap remains as constant as possible during transport.

This problem is solved by the features defined in the characterizing portion of claim 1.

The basic idea of the solution according to the invention is that a tactile measurement sensor is positioned directly at the lashing strap in order to measure the lashing tension effective in the tensioned strap. For this purpose, the device according to the invention includes a wind-up spindle driven by an electric motor for winding up the lashing strap beginning at its loose end. The wind-up spindle is rotatably held in a basic frame which is mounted at its essentially planar receiving surface, for example, on or underneath the bed of a truck. At the same time, the tactile measurement sensor is shaped to the basic frame in such a way that the lashing strap coming from the load is deflected at the measurement sensor so that the lashing strap charges the measurement sensor with pressure. The measurement sensor is provided with a movable sensor tongue which measures the deflection pressure as a measurement value of the lashing tension. The value determined in this way is forwarded to an electronic control unit regulating the drive motor. The drive motor drives the wind-up spindle in dependence on the signals from the electronic control unit, thus closing the control circuit.

An embodiment of the device permits the structurally simple connection of the electric motor to the on-board electrical system of the truck. Compared to the prior art, this embodiment eliminates the need for a structurally expensive compressed-air assembly mounted on the truck.

Another embodiment of the device relates to a particularly favorable feature of the measurement sensor as a three-point measuring element or device. Here, the sensing tongue is configured in the form of a cylindrical sensor bar which is disposed between two projections that are convexly rounded at their end faces. The lashing strap is in contact with the end faces of the projections as well as with the sensor bar. The principle of such a three-point measuring device is known in the textile industry for measuring the tensile strength of yarns. This involves a determination of the slope angle of the tangent which theoretically connects the point of contact of the strap at one projection end face with the point of contact of the strap at the sensor bar. The slope angle of the tangent changes with the lashing tension charging the sensor bar. The tangent slope angle present at the respectively effective strap tension is thus the basis for a mathematically accurate pre-calculation of that momentary angle position which the sensor bar must take up when the defined desired tension is present. Consequently, each position of the sensor bar can in this way be accurately associated with a lashing tension value.

In conjunction with a further embodiment of the device, a spring element applies a force to the sensor bar on its side facing away from the lashing strap. The lashing tension acting directly on the sensor bar is directly proportional to the path of initial deflection of the spring element. The measurement sensor which thus acts in the manner of a compression spring scale is additionally provided with a contact pin that is movable in the initial spring deflection direction and which, when the desired tension is reached, lies against a contact plate shaped onto the measurement sensor housing. If the tension falls below the desired tension, the compression spring element is deflected in a direction opposite to its initial deflection direction and the contact between contact pin and contact plate is interrupted, thus sending a signal to the electronic control unit which immediately sends a signal to the drive motor for re-tightening the lashing strip.

The variable adjustability of the value for the desired lashing tension in a still further embodiment is of particular advantage.

Particularly accurate measuring results are furnished by a measurement sensor embodiment in the form of a wire strain gauge. However, if such a wire strain gauge is employed, it must be taken into consideration that the structure is very complicated and thus expensive due to the required zero point regulation and the necessary measures to maintain a constant ambient temperature in the region of the wire strain gauge. Moreover, under extreme conditions of use, this may involve higher servicing expenditures than a mechanical embodiment.

The configuration of the basic frame of the device involves a particularly favorable arrangement of the wind-up spindle. The wind-up spindle here lies protected between the side walls of the basic frame, with the inner faces of the side walls guiding the strap in its transverse direction so that a flush coil is produced during winding. Moreover, rubbing of the strap at sharp edges is almost impossible due to the convex surfaces of the measurement sensor components and the configuration of the basic frame.

The use of worm gears is particularly advantageous because of the self-locking action of this type of drive when at rest. Thus, it is impossible for the wind-up spindle to be turned back as a result of the force exerted on it by the lashing strap. The sloped teeth of the worm gears are able to transfer comparatively high torques with small worm gear wheel diameters.

The arrangement of the drive motor relative to the drive shaft permits a particularly compact structure for the entire device.

The symmetrical configuration of the entire basic frame according to is particularly advantageous from a manufacturing point of view because of the identical parts involved. Also it is possible to manufacture different, mirror image versions of the device which permit attachment of the device on a desired side of the truck bed. The encapsulation of the individual device components is particularly advantageous in use since neither the drive motor nor the drive mechanism will be able to be soiled. The required maintenance measures are thus advantageously reduced. Additionally, the encapsulation provides a crumple zone-like protection against extreme shock and impact stresses. Moreover, the encapsulation dampens the noise emission of the device to a considerable degree. Thus, the integrated structure constitutes a particularly harmonious attachment to a load-carrying surface.

The basic concept of the integrated structure ensures advantageous guidance of the strap and a high reliability in use of the entire device during the transporting of goods.

The invention and further features which are significant for the invention will now be described with reference to an embodiment thereof that is illustrated in the drawing figures.

BRIEF DESCRIPTION OF THE DRAWINGS

It is shown in:

FIG. 2, a sectional side view of the device as seen along auxiliary line II—II in FIG. 1;

FIG. 3, an enlarged detail view of the measurement sensor of FIG. 2.

DESCRIPTION OF THE PREFERRED EMBODIMENT

Figure 1:
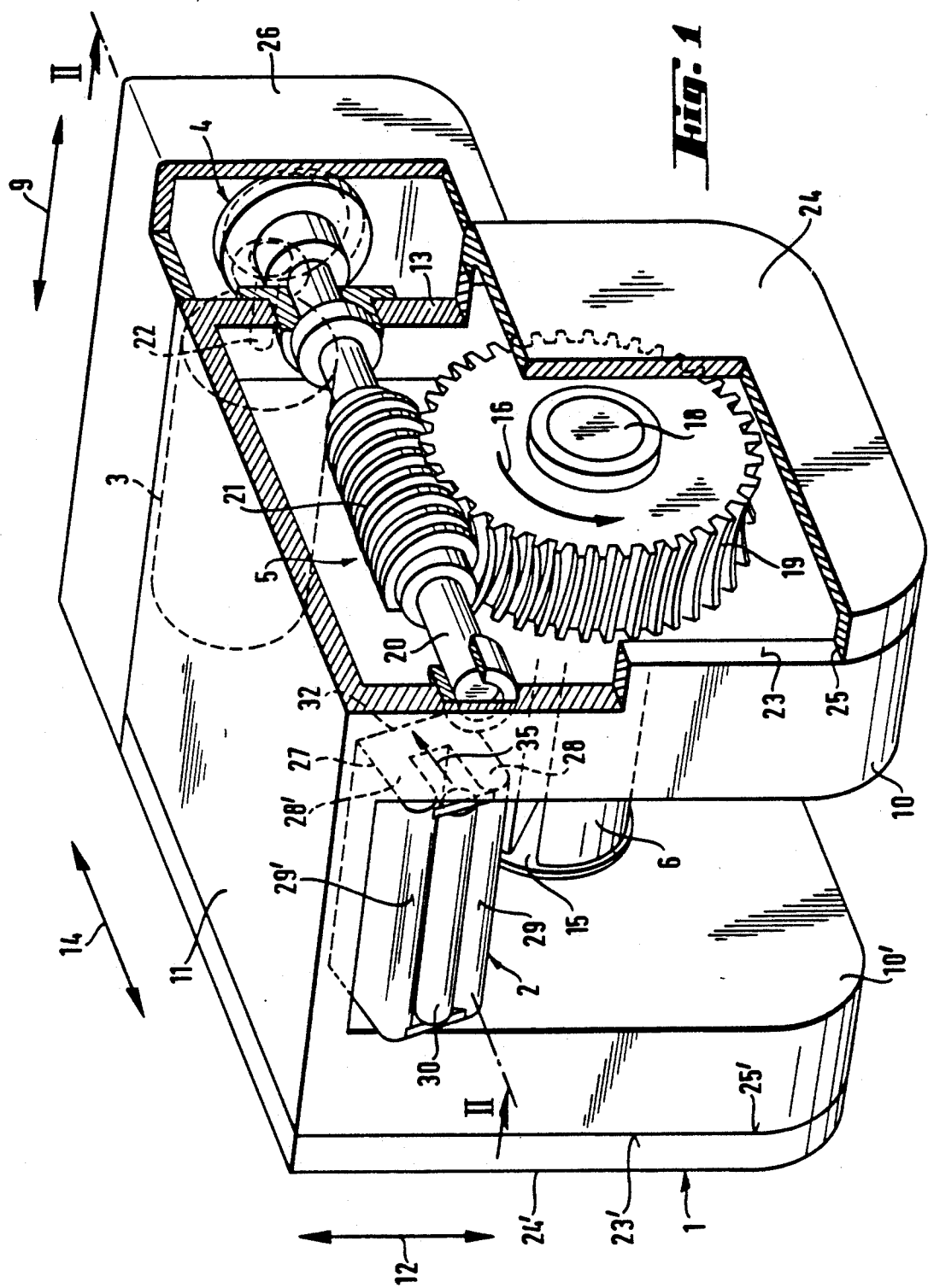
FIG. 1, a perspective overall view, partially in section, of the device.

The device, hereinafter called a tensioning winch, is essentially composed of a basic frame 1, a measurement sensor 2, a drive motor 3, an intermediate gear 4, a main drive assembly 5, and a wind-up spindle 6 for winding up the lashing strap 7 beginning at its loose end 8. The basic frame 1 has a U-shaped cross section extending in the transverse direction 9 of lashing strap 7. The arms of the U-shaped cross section form side walls 10 and 10' of the frame. The connection surface 11 connects the frame side walls 10, 10' to form the U-shaped cross section of the basic frame. In a vertical direction 12 extending parallel to the frame side walls 10 and 10' and perpendicular to transverse direction 9, there extends the frame rear wall 13 which is at a right angle to the end faces of frame side walls 10 and 10' and the end face of connection surface 11. Frame side walls 10 and 10', connection surface 11 and frame rear wall 13 are thus combined into basic frame 1.

The frame side walls 10 and 10', which extend in the plane defined by vertical direction 12 and longitudinal direction 14 which is perpendicular to transverse direction 9 and to vertical direction 12, have approximately quadrate dimensions and are provided with recesses in their interior for rotatably supporting wind-up spindle 6. The recesses are formed in frame side walls 10, 10' approximately at the point of intersection of the two diagonals of the square faces of frame side walls 10 and 10', respectively. The wind-up spindle is thus fixed in the center of basic frame 1 and is penetrated over its entire width, diametrally in transverse direction 9, by an intake slot 15. For winding up lashing strap 7, its loose end 8 is pulled through intake slot 15, producing the strap coil 17 by rotation of wind-up spindle 6 in the wind-up direction 16.

In transverse direction 9, a spindle region 18 shaped onto wind-up spindle 6 penetrates frame side wall 10. The spindle region 18 projecting beyond the exterior of frame side wall 10 supports a worm gear 19 which in this way is rigidly connected in a driving manner with wind-up spindle 6. Seen in vertical direction 12, a drive shaft 20 extending in longitudinal direction 14 and rotatably mounted in frame side wall 10 lies above worm gear 19 and has a worm 21 attached there. Worm 21 and worm gear 19 constitute the mentioned main drive assembly 5.

The free end of drive shaft 20 penetrates rear frame wall 13 and opens into intermediate gear 4 which, in longitudinal direction 14, is positioned next to rear frame wall 13. Drive motor 3 is positioned next to intermediate gear 4 when seen in transverse direction 9, with its motor shaft 22 opening into intermediate gear 4.

The tensioning winch is tensioned as follows:

Drive motor 3 transfers its driving power by way of its motor shaft 22, which acts as driven shaft, into intermediate gear 4. The driving power is there transferred to drive shaft 20 and transmitted by way of worm 21 to worm gear 19. Worm gear 19, which rotates in the wind-up direction 16, drives wind-up spindle 6 by way of shaft region 18 in such a manner that the latter rotates in wind-up direction 16. Lashing strap 7 is thus wound around wind-up spindle 6 so that a strap coil 17 is continuously built up. Once the desired tension of lashing strap 7 has been reached, drive motor 3 is turned off so that wind-up spindle 6 stands still. Due to the self-locking action of main drive assembly 5, a reverse rotation of wind-up spindle 6 in the direction opposite to wind-up direction 16 is prevented. The main drive assembly 5 thus simultaneously acts as a lock for the tensioning winch.

Frame side wall 10 has wall projections 23 which project in transverse direction 9 and, in conjunction with connection surface 11 which likewise projects beyond frame side wall 10 in transverse direction 9, forms a bowl-like half shell to accommodate the main drive assembly 5. The likewise half-shell shaped side wall cover 24 and its cover projections 25 which project in transverse direction 9 are placed onto wall projections 23, with cover projections 25 lying against wall projections 23. Frame side walls 10 and their wall projections 23 together with side wall covers 24 and their cover projections 25 form a housing which encapsulates the main drive assembly.

Due to the axially symmetrical configuration of the frame, frame side wall 10' also has wall projections 23' which project in transverse direction 9 and against which side wall cover 24' has been placed so that its cover projections 25' are in contact therewith. Frame side wall 10' and its wall projections 23' together with side wall cover 24' and cover projections 25' form an encapsulated switching box for an electronic control unit (not shown in detail).

The encapsulation of ancillary drive assembly 4 and drive motor 3 is realized by a box-shaped motor hood 26 that is open on one side. The open side of motor hood 26 is pushed over intermediate gear 4 and drive motor 3 in such a manner that its end faces lie firmly against rear frame wall 13. Motor hood 26 here has the spatial configuration of a box-like trough.

On the free side of basic frame 1 facing away from frame rear wall 13 and flanked by the interior faces of frame side walls 10 and 10', measurement sensor 2 is mounted below connection surface 11. Measurement sensor 2, in turn, has an essentially U-shaped measurement sensor housing 27. The arms of the U-shaped housing 27 are shaped as cheek-like projections 28, 28' provided with convexly shaped end faces 29 and 29' which are in firm contact with the one flat side 40 of lashing strap 7.

The sensor tongue configured as a cylindrical sensor bar 30 and extending in transverse direction 9 lies between projections 28 and 28'. Part of the cylindrical surface of this sensor bar 30 also lies against the flat side 40 of lashing strap 7. Seen from lashing strap 7, projections 28 and 28' and sensor bar 30 form a corrugated contact surface having three convex partial faces and consisting, so to speak, of three semi-cylinders for engaging the flat side 40 of lashing strap 7. The partial surface of the exterior face of sensor bar 30 facing away from lashing strap 7 lies against spring element 31 under spring pressure, with the spring element, flanked by projections 28 and 28', disposed between sensor bar 30 and the sensor housing rear wall 32 which supplements projections 28 and 28' to form the U-shaped measurement sensor housing 27.

The measurement sensor housing 27 composed of sensor housing rear wall 32 and projections 28 and 28' is penetrated by a guide channel 33 in the region of sensor housing rear wall 32. Guide channel 33 is substantially coaxial with the center longitudinal axis of spring element 31 which is configured as a helical spring. A contact pin 34 which passes through spring element 31 approximately coaxial with the central longitudinal axis of the spring element is connected to the partial outer face of sensor bar 30 facing away from lashing strap 7 and in contact with spring element 31. Contact pin 34 projects from sensor bar 30 through spring element 31 into guide channel 33. Contact pin 34 is here connected so as to move with sensor bar 30 in such a way that it is moved in the guide channel over the same path in the spring deflection direction 35 as sensor bar 30 is moved against spring element 31 by its initial spring deflection length.

On the rear side of sensor housing rear wall 32 facing away from lashing strap 7 and spring element 31, in the region of guide channel 33, there is fixed a contact plate 37 which projects into sensor housing rear wall 32. At its lateral flanks, contact plate 37 is provided with threads 38 with which it can be moved against the spring deflection direction 35 in the direction toward spring element 31.

The measurement sensor 2 operates as follows:

Lashing strap 7 extends approximately in the vertical direction 12 from the load past connection surface 11 toward measurement sensor 2. The end face 29 of the projection 28 of measurement sensor 2 and its sensor bar 30 project beyond envelope curves 39 which delimit the basic frame 1 relative to lashing strap 7 in the longitudinal direction 14 and in the vertical direction 12. Due to the wind-up spindle 6 being offset in the longitudinal direction 14 relative to the previous direction of strap travel, the strap must be deflected for its further travel. The partial projection beyond envelope curve 39 causes the end face 29 of projection 28 and sensor bar 30 to act as a deflection edge on lashing strap 7 whose flat side 40 lies against it. Thus, lashing strap 7 initially extends tautly in the vertical direction 12 toward the end face 29 of projection 28. At end face 29, lashing strap 7 is deflected by way of sensor bar 30 and end face 29' to continue still tensioned in the direction toward strap coil 7 on wind-up spindle 6. During its deflection, lashing strap 7 tangentially contacts the end faces 29 and 29'.

Because of its deflection, lashing strap 7 presses with all of its force resulting from its lashing tension onto sensor bar 30. Thus sensor bar 30 is moved in the initial spring deflection direction 35 against spring element 31, with contact pin 34 being also moved in the spring deflection direction 35 in guide channel 33. If lashing strap 7 is now pre-tensioned according to the above described method until it reaches its desired tension, lashing strap 7 reaches this defined desired tension precisely at that moment at which contact pin 34 and contact plate 37 contact one another.

If, during transport, the strap tension drops due to, for example, settling or displacement of the load, sensor bar 30 and contact pin 34, urged by spring element 31 in a direction opposite to the spring deflection direction 35, move toward lashing strap 7. Contact pin 34 and contact plate 37 thus lose contact with one another. This absence of contact between contact plate 37 and contact pin 34 generates a signal to the electronic control unit disposed in frame side wall 10' to send a signal to turn on drive motor 3. Lashing strap 7 is now tensioned again in the manner described above until contact pin 34 again lies against contact plate 37.

By screwing contact plate 37 in the direction of or in the direction opposite to initial spring deflection direction 35, the given lashing tension can be varied and adjusted. The given desired tension is increased by a screwing movement in the spring deflection direction 35, while a screwing movement in the direction opposite to the spring deflection direction 35 reduces the desired tension.

I claim:

1. A tensioning and winding device for lashing straps comprising:
    a drive motor;
    a wind-up spindle driven by said drive motor for winding up a lashing strap, said lashing strap having a flat side; and
    a measurement sensor means for measuring tension in said lashing strap, said sensor means comprising:
      a) a sensor tongue abutting against the flat side of said lashing strap;
      b) two projections which between them guide and laterally flank the sensor tongue, said projections including end faces which abut against the flat side of said lashing strap and together with said sensor tongue define a three-point measuring element, said measuring element bending the lashing strap through a slope angle as defined by three points of tangency where the lashing strap makes contact with said end faces and said sensor tongue disposed therebetween, whereby said sensor tongue abuts against the lashing strap and exerts a deflection pressure against said lashing strap, said sensor means measuring the deflection pressure exerted by said sensor tongue on the lashing strap as a measured value of the tension in said lashing strap; and
      c) means for transmitting the measured value as an actual value to a control circuit for turning on the drive motor for the wind-up spindle so as to maintain a desired lashing tension.

2. A device according to claim 1, wherein the drive motor comprises means for being supplied with energy by an on-board electrical system of a truck.

3. A device according to claim 1, wherein the sensor tongue further comprises a cylindrical sensor bar whose longitudinal axis extends in a direction transverse to the direction of travel of said lashing strap, and the end faces of the two projections facing the lashing strap have a convex shape.

4. A device according to claim 1, wherein said sensor tongue comprises a contact face for contacting the flat side of said lashing strap and a rear face spaced from said contact face, said rear face being urged toward said lashing strap by a spring element and being provided with a contact pin connected thereto, said contact pin projecting at substantially a right angle with respect to said rear face.

5. A device according to claim 4, wherein the spring element comprises a coil spring helically surrounding the contact pin, with the contact pin penetrating the spring element in the center substantially along the center longitudinal axis of the spring element.

6. A device according to claim 4, further comprising a measurement sensor means housing having a rear wall, a passage opening which penetrates the measurement sensor means housing rear wall parallel to and substantially coaxial with the center longitudinal axis of the spring element as a guide channel for the contact pin.

7. A device according to claim 6, wherein the contact pin is displaceable relative to the spring element along the center longitudinal axis of the spring element and is guided by inner walls of the guide channel, and projects into the guide channel; and a contact plate which projects into the guide channel is mounted on the rear wall of the measurement sensor means housing in the region of the guide channel at an exterior side facing away from the spring element.

8. A device according to claim 7, wherein said measurement sensor means is configured such that said drive motor is not switched on as long as the contact pin lies against the contact plate, whereby said contact pin lying against said contact plate defines a rest position of said sensor means.

9. A device according to claim 7, wherein said measurement sensor means is configured such that a switching position for the generation of a control signal for switching on the drive motor is effected for said sensor means by an absence of contact between the contact plate and the contact pin.

10. A device according to claim 7, further comprising means for adjusting a relative position of said contact plate with respect to said contact pin.

11. A device according to claim 10, further comprising means for setting a desired tension in said lashing strap by adjusting the relative position of said contact plate with respect to said contact pin, said means for setting including a measuring scale at the measurement sensor housing for permitting said desired tension to be read therefrom.

12. A device according to claim 4, wherein said spring element is configured to be deflected in a spring deflection direction by an amount which is proportional to the lashing tension of said lashing strap.

13. A device according to claim 1, wherein the two projections comprise two side arms of a measurement sensor means housing that has a U-shaped cross section, and a spring element is provided which loads the sensor tongue against the flat side of said lashing strap, and the spring element and the sensor tongue lie between the two projections and are guided by the two projections.

14. A device according to claim 13, wherein the spring element lies in abutment against a vertical arm, said vertical arm forming a rear wall of the measurement sensor means housing connecting said two side arms.

15. A device according to claim 13, further comprising a basic frame having arms and a connection surface disposed on said basic frame, said basic frame enclosing the measurement sensor means housing, the measurement sensor means housing being fixed between the arms of the basic frame at an interior side of the connection surface facing the wind-up spindle and opposite an interior side of a frame rear wall in such a manner that the two projections and the sensor tongue project from the envelope defined by the basic frame in the direction toward the flat side of a lashing strap.

16. A device according to claim 1, further comprising:
an essentially U-shaped basic frame having two side walls, said wind-up spindle being rotatably mounted between said two side walls; and
an arm connecting the two side arms and having a surface on its side facing away from the wind-up spindle, said arm being configured as a connection surface.

17. A device according to claim 1, wherein an insertion slot for receiving a loose end of said lashing strap penetrates the wind-up spindle diametrally over its entire length.

18. A device according to claim 17, further comprising a worm gear whose rotation axis is coaxial with the wind-up spindle, and a reversing gear driven by the drive motor, wherein the drive motor, by way of the reversing gear functioning as an intermediate gear and by way of the worm gear functioning as a main drive assembly, drives the wind-up spindle to cause the wind-up spindle to rotate about its axis of rotation in order to wind up the lashing strap, with the loose end of the lashing strap being inserted in said insertion slot.

19. A device according to claim 1, further comprising a worm gear attached to a side of said wind-up spindle such that a rotation axis of said worm gear coincides with a rotation axis of said wind-up spindle.

20. A device according to claim 19, further comprising a drive shaft having a worm attached thereto, said worm being in engagement with said worm gear.

21. A device according to claim 20, wherein a driving end of the drive shaft includes a reversing gear driven by the drive motor by way of a motor shaft.

22. A device according to claim 21, wherein the reversing gear is attached to the drive shaft.

23. A device according to claim 20, further comprising a basic frame having side arms, the side arms of the basic frame form hollow frame side walls in such a way that one frame side wall receives the worm gear and the worm and an oppositely disposed frame side wall accommodates an electronic control unit.

24. A device according to claim 23, further comprising a connection surface disposed on said basic frame and connecting said side walls, and a frame rear wall further connecting the side walls at approximately a right angle to said connection surface and to said side walls and through which passes the drive shaft, said frame rear wall being formed on end faces of said connection surface and of said side walls.

25. A device according to claim 24, wherein a driving end of the drive shaft includes a reversing gear driven by the drive motor by way of a motor shaft, and the drive motor and the reversing gear are flanged to the exterior of the frame rear wall and are protectingly enclosed by a hollow box like cover.

26. A device according to claim 24, wherein the exterior faces of the frame side walls are covered by removable cover plates.

* * * * *